United States Patent [19]

Dholakia

[11] 4,173,348
[45] Nov. 6, 1979

[54] GROOVED RECORD PLAYBACK SYSTEM

[75] Inventor: Anil R. Dholakia, East Windsor, N.J.

[73] Assignee: RCA Corporation, New York, N.Y.

[21] Appl. No.: 898,435

[22] Filed: Apr. 20, 1978

[51] Int. Cl.$^2$ ............................................. G11B 3/58
[52] U.S. Cl. ........................................ 274/47; 274/37; 358/128
[58] Field of Search .................... 274/37, 47, 23 A; 358/128

[56] References Cited

U.S. PATENT DOCUMENTS

| | | |
|---|---|---|
| 3,641,284 | 2/1972 | Westerkamp et al. ................ 274/37 |
| 3,817,538 | 6/1974 | Senrick .................................. 274/47 |
| 3,822,065 | 7/1974 | Arbib ..................................... 274/47 |
| 3,993,863 | 11/1976 | Leedom et al. ...................... 358/128 |
| 4,049,280 | 9/1977 | Leedom ................................ 274/37 |

*Primary Examiner*—Steven L. Stephan

*Attorney, Agent, or Firm*—Eugene M. Whitacre; Joseph S. Tripoli; Dilip A. Kulkarni

[57] ABSTRACT

A composite stylus assembly, provided for a grooved disc record playback system, includes a playback stylus supported on a free end of an arm. The other end of the arm is supported by a flexible mount in a cartridge. The stylus rides in the groove of the record for information recovery. The arm is located within a hollow tube which is supported at one end thereof by the flexible mount. The free end of the tube includes a mechanism which aids in the steady inward movement of the tube relative to the disc center when relative motion between the disc and the playback stylus is established. When the playback stylus retraces the same groove convolution, the inward motion of the hollow tube exerts enough force on the stylus arm to enable the playback stylus to ride over the walls of the groove.

7 Claims, 5 Drawing Figures

GROOVED RECORD PLAYBACK SYSTEM

The present invention relates to spirally grooved disc record playback systems. More particularly, it relates to an arrangement for providing a novel signal pickup arm assembly which includes means for enabling a playback stylus, which rides in the groove, to skip groove convolutions.

In certain sophisticated information recording and playback systems, information is recorded in the bottom of a smooth spiral groove on the surface of a recording medium. High information packing densities in such systems are achieved by having groove densities in the order of four to eight thousand groove convolutions per inch.

One example of such a system is described in U.S. Pat. No. 3,842,194, issued on Oct. 15, 1974 to Jon K. Clemens. Illustratively, the Clemens system employs a disc-shaped recording medium having video and audio information recorded by means of geometric variations in the bottom of a smooth spiral groove on the surface thereof. The groove is coated with a layer of conductive material which, in turn, is coated with a layer of a dielectric material. During record playback, information is recovered from the bottom of the groove by means of a signal pickup electrode supported on a playback stylus mounted at one end of a pickup arm of the player system. The playback stylus engages the spiral groove, during playback, and as relative motion is established between the disc and the electrode, an electrode-disc capacitance varies in response to the geometric variations in the bottom of the spiral groove passing beneath the electrode. The capacitance variations are converted to electrical signal variations by suitable signal processing circuitry coupled to the electrode.

One problem associated with the operation of an information recording and playback system of the above-described type is the presence of dust and debris particles in various regions of the disc groove. Playback stylus encounters with such dust and debris particles often result in the deflection of the playback stylus out of engagement with the bottom of the groove leading to momentary distress or loss of information signals. More severe encounters may result in the playback stylus skipping several groove convolutions at a time leading to the loss of a plurality of frames of video information. Dust and debris particles in groove regions may also be responsible for or contribute to locked groove incidents which cause the playback stylus to retrace the same region of the groove. Moreover, these encounters may result in the rapid wear of the disc and the signal pickup electrode (e.g., as the playback stylus lands on the rapidly rotating disc surface after being deflected).

In accordance with the principles of the present invention, partial alleviation of the problems produced by the dust and debris particles may be accomplished by utilizing additional styli to engage, in simulated playback fashion, the smooth groove of the information record prior to the actual playback of the record. It is believed that the additional styli scrape the debris particles off the groove wall thereby effecting a "cleaning" of the groove for the benefit of the playback stylus.

In further accordance with the principles of the present invention, a "scraper" stylus, generally of the same shape and formed of the same material as the playback stylus, may be mounted on a free end of a hollow tube within which the pickup arm is substantially concentrically positioned. The scraper stylus is preferably supported in a spaced apart relationship from the playback stylus and disposed on the tube so as to engage, during record playback, the groove of the information record in a position ahead of the playback stylus. With many dust and debris particles removed from the path of the playback stylus, the tracking stability of the playback stylus is enhanced.

While instances where the playback stylus becomes airborne still remain, the adverse effects of the incidents are greatly reduced due to the fact that the hollow tube, which is desirably of a larger mass than the pickup arm and the playback stylus, helps maintain the radial position of the pickup arm substantially unaffected by the disengagement of the playback stylus, and further provides reasonable assurance that the playback stylus will land in the groove at a position ahead of its take-off position. Though loss of signal information still occurs during these incidents, such loss is not as severe as would occur in the absence of the hollow tube where, without the maintenance of the radial position of the pickup arm, the playback stylus may land in the groove at a position in back of its disengagement position. The repetition of the signal information makes the incident more noticeable to the viewer than the absence thereof.

In accordance with another embodiment of the present invention, a piece of velvet pad, (such as "Politex Supreme" polishing cloth manufactured by GeoScience Instrument Co., of Stamford, Conn.) is supported at the free end of the hollow tube instead of the scraper stylus. The velvet cloth is supported in a manner which effects contact of the velvet pile or bristles with a relatively large area of the disc surface, as compared to the area engaged by the playback stylus, thereby covering more than one convolution of the disc record groove. The simultaneous coverage of more than one groove convolution enhances the ability of the velvet pad to track the record groove since the effects of encounters with dust and debris particles in any one groove convolution will be reduced correspondingly to the increase in the contact with the grooved surface area. Therefore, the velvet pad in effect cooperates with the groove of the record, during playback, in a manner which enables a steady inward movement of the tube relative to the disc center when relative motion between the disc and the playback stylus is established. When the playback stylus retraces the same groove convolution, i.e., a locked groove is encountered, the hollow tube's inward motion exerts enough force on the stylus arm to enable the playback stylus to ride over the walls of the groove.

In accordance with yet another embodiment of the present invention, the stylus arm is mounted substantially concentric within the hollow tube by means of a support member which is relatively flexible in only one direction. Advantageously, the support member is oriented within the hollow tube in a manner whereby the member is flexible in a direction which lies in a plane which vertically intersects the surface of the disc record during record playback.

IN THE ACCOMPANYING DRAWING

Figure 1:
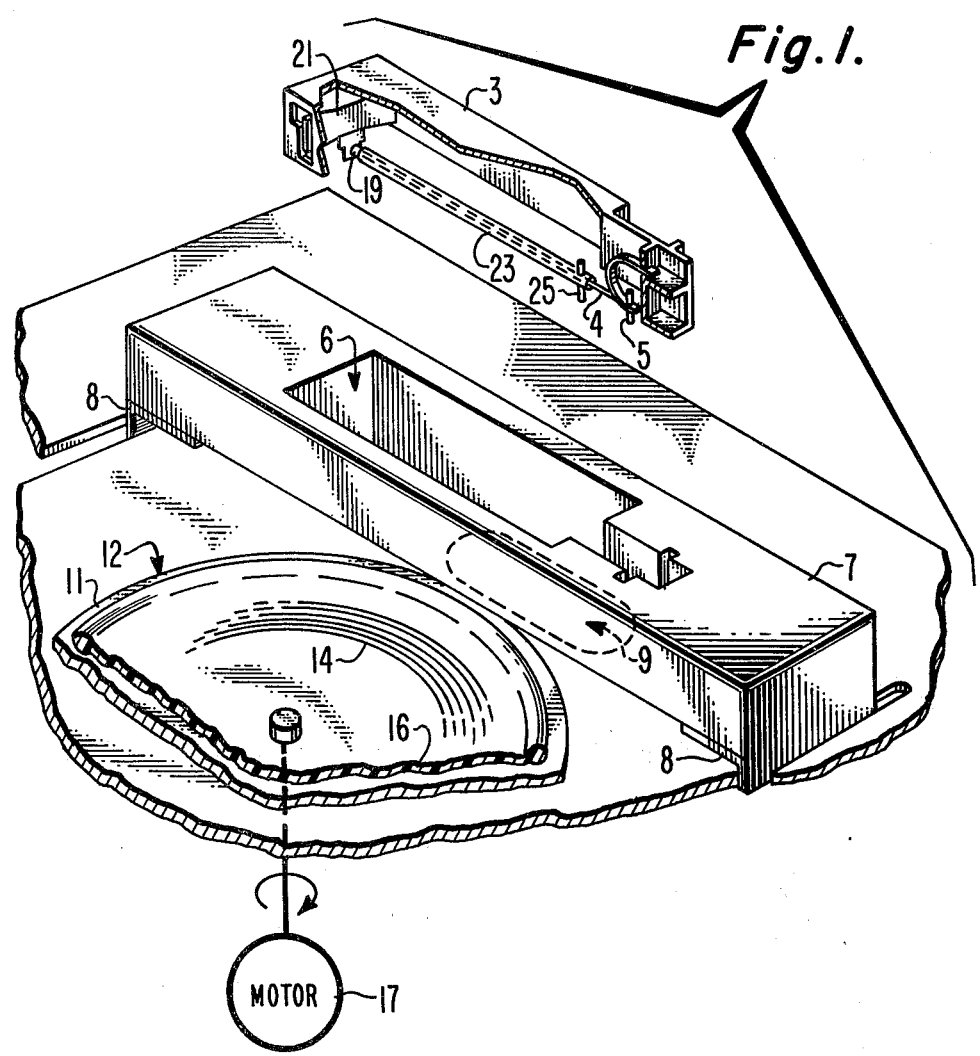
FIG. 1 is a perspective view of a video disc player system embodying the invention.

With reference to FIG. 1, a video disc playback system includes a housing support in the form of cartridge 3 enclosing a pickup arm 4, the free end of which supports a stylus 5. The cartridge 3 is received in a compartment 6 of a box-like carriage 7 which is mounted to a support member 8 for movement between an off-turntable standby position and an above-turntable playback position. During playback, the pickup arm 4 passes through an opening 9 in a bottom wall of the carriage 7. Support member 8 is driven by a radial drive feed mechanism illustratively of a type described in U.S. Pat. No. 3,870,835, to F. R. Stave. Details of the cartridge 3 are described in U.S. Pat. No. 4,049,280, to Marvin Leedom.

The player system further includes a turntable 11 supporting a video disc record 12 of a type having video information recorded by means of geometrical variations (not shown) in a spiral groove 14 on the surface thereof. The record 12, illustratively of a type shown in the aforementioned Clemens patent, includes a thin coat of dielectric material covering a conductive material which is disposed on the grooved surface of the disc (e.g., only a dielectric substrate 16 being shown). A non-coated conductive disc having the appropriate electrical and mechanical properties may also be used in such a playback system. A motor 17, mechanically coupled to the turntable 11, effects rotation of the turntable in a CW direction relative to the carriage 7.

Figure 2:
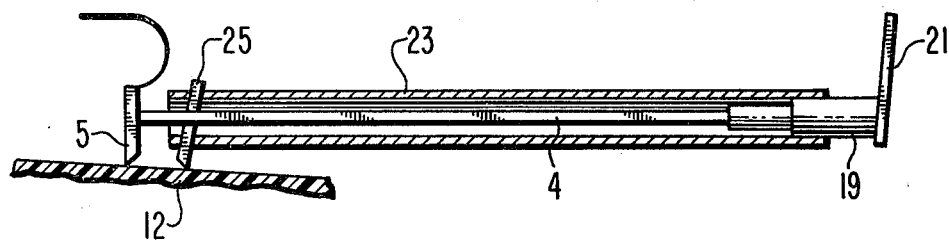
FIG. 2 is a longitudinal cross-section of the pickup arm assembly of the embodiment of FIG. 1.

With reference to FIGS. 1 and 2, the arm 4 is attached at one end thereof, remote from the stylus carrying end, to housing support 3, by means of a compliant support 19 and a connector plate 21, which permits pivotal motion of the arm 4. Compliant support 19 which includes telescoping sections also serves as support for a hollow tube 23 within which arm 4 is substantially concentrically positioned as shown in FIG. 2. The telescoping sections of compliant support 19 permits relatively independent pivotal motion of the arm 4 and the tube 23.

Figure 3:
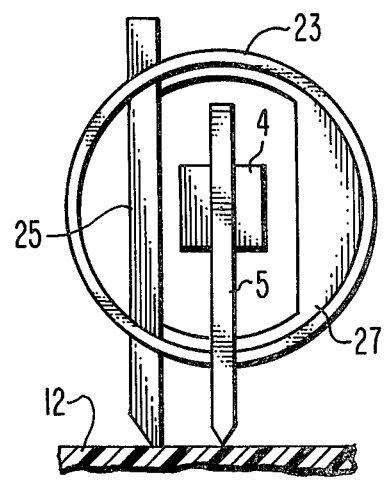
FIG. 3 is an end view of the pickup arm assembly of the embodiment of FIG. 1.

As shown in FIG. 3, a scraper stylus 25, generally of the same shape and formed of the same material as the playback stylus 5, is mounted on the free end of a hollow tube 23 within which the pickup arm 4 is substantially concentrically positioned. The scraper stylus is preferably supported in a spaced-apart relationship from the playback stylus 5 and disposed on the tube 23 so as to preferably engage, during record playback, the groove of the information record in a position ahead of the playback stylus 5. The tube 23 may comprise a "stone wall" section 27 which bears upon the arm 4 when the relative advance of the playback stylus 5, towards the center of the disc, lags behind the advance of the scraper stylus 25.

Figure 4:
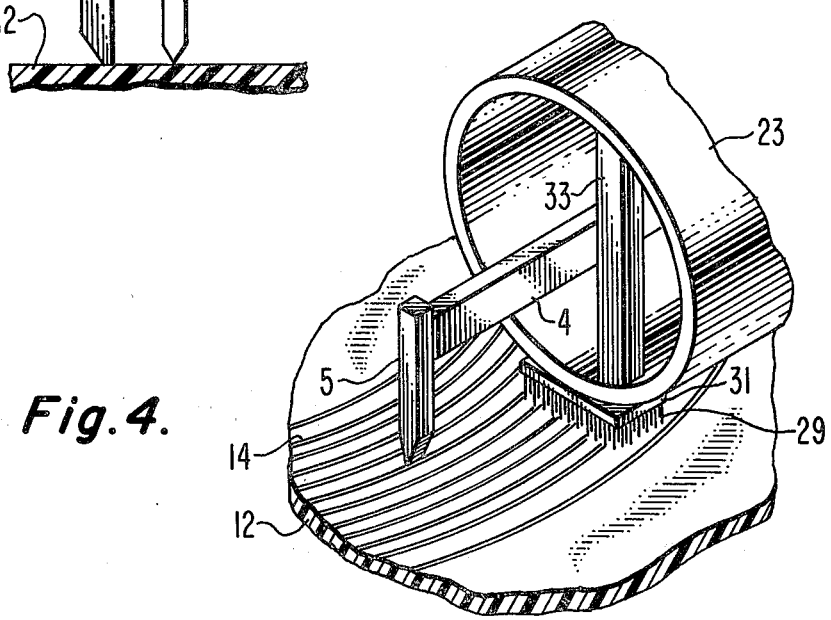
FIG. 4 is a perspective end view of a pickup arm assembly of another embodiment of the present invention suitable for use in the system of FIG. 1.

FIG. 4 illustrates another embodiment of the present invention wherein a piece of velvet cloth 29 (such as rayon) is supported at the free end of the hollow tube instead of the scraper stylus. The velvet cloth 29 is supported, on appropriate backing material 31, in a manner which effects engagement of the pile or bristles with a relatively large area of the disc surface as compared to the playback stylus 5, thereby engaging or contacting more than one convolution of the disc record groove. By simultaneously contacting more than one groove convolution, the ability of the velvet pad to track the record groove is greatly enhanced since the effects of encounters with dust and debris particles in any one groove convolution will be reduced correspondingly to the increase in the grooved surface area contacted. This disc surface area contacted is preferably large enough to comprise a circular area with a radius which spans several convolutions of the groove of the disc record. The velvet pad cooperates with the surface of the record, during playback, in a manner which enables a steady inward movement of the tube relative to the disc center when relative motion between the disc 12 and the playback stylus 5 is established. When the playback stylus 5 retraces the same groove convolution, (incidence of locked groove) the hollow tube's inward motion, as the relative distance between the playback stylus and the pad exceeds a predetermined distance, exerts enough force on the pickup arm 4, by means of contact between a "stone wall" member 33, supported in the tube 23 and the pickup arm 4, to enable the playback stylus 5 to ride over the walls of the groove.

Figure 5:
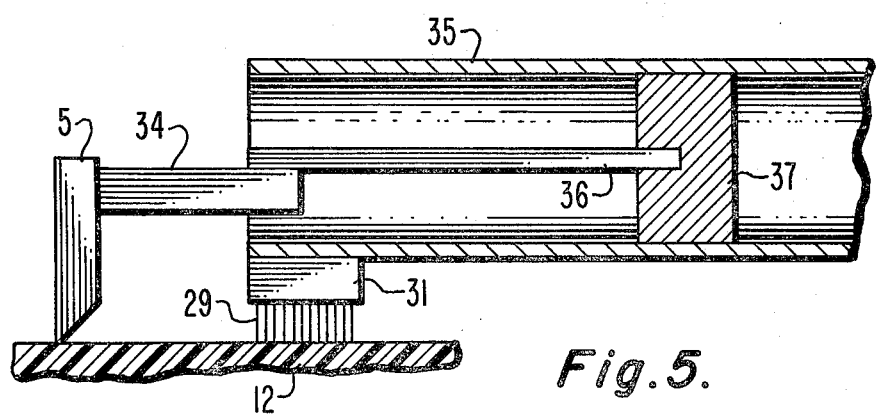
FIG. 5 is a longitudinal cross-section of a pickup arm assembly of yet another embodiment of the present invention suitable for use in the system of FIG. 1.

In FIG. 5, yet another embodiment of the present invention is illustrated wherein a stylus support 34 is directly, concentrically mounted within a pickup arm 35 in the form of a hollow tube by means of a support member 36 which is relatively flexible in only one direction. Advantageously, the support member 36 is oriented within the hollow tube in a manner whereby the member is flexible in a direction which lies in a plane which vertically intersects the surface of the disc record 12 during record playback. Support element 36 is rigidly attached to the arm 35 such as by means of a plug 37. The velvet pile 29 and backing material 31 are positioned at the free end of the arm 35 in a similar manner to that described with reference to the embodiment of the invention illustrated in FIG. 4. Arm 35, which is advantageously of a heavier mass than the combination of playback stylus 5, stylus support 34 and flexible support element 36, insures that the playback stylus will proceed, along the groove, towards the record center at a steady radial rate. Furthermore, during encounters of the playback stylus 5 with locked grooves, the radial motion of the tube will force the stylus 5 over the groove wall. Since the stylus 5 is free to move in a direction which is vertical to the plane of the record surface, its ability to overcome debris particles formed within the groove will be enhanced.

What is claimed is:

1. A pickup apparatus for use with a disc record having an information bearing spiral groove disposed on the surface thereof; said apparatus comprising:

(A) A first record engaging means comprising a playback stylus having an elongated rigid element tapering to a tip at one end thereof, which tip is dimensioned for reception within said groove during playback; said first record engaging means subject to radial motion toward the center of said record playback;

(B) A pickup arm carrying said first record engaging means at one end thereof;

(C) A second record engaging means separate from said first record engaging means; said second record engaging means subject to radial motion toward said record center independent of said radial motion of said first record engaging means during playback;

(D) A separate support arm carrying said second record engaging means at one end thereof; and (E) Means for supporting said pickup arm and said support arm in a manner permitting variation in the separation between the radial location of said first record engaging means relative to the radial location of said second record engaging means during playback; said support arm being subject to engagement with said pickup arm when said radial separation between said first record engaging means and said second record engaging means exceeds a predetermined distance; said radial motion of said first record engaging means tracking said radial motion of said second record engaging means during the period of said arm engagement.

2. Apparatus as defined in claim 1 further including a cartridge having a connecting member to which said supporting means is secured; said cartridge having an opening through which said first and second record engaging means protrude during playback for record engagment.

3. Apparatus as defined in claim 2 for use with a playback system including a carriage subject to translation during playback along a path radially disposed relative to said record; said carriage having a compartment for receiving said cartridge; said carriage further having an opening through which said first and second record engaging means extend during playback for record engagement.

4. Apparatus as defined in claim 1 wherein said support arm is in the form of a hollow tube; wherein said supporting means includes a compliant support having a first portion and a further portion, said tubular support arm and said pickup arm being respectively secured to said first portion and said further portion such that said pickup arm is disposed substantially centrally of said tubular support arm.

5. Apparatus as defined in claim 1 wherein said support arm is in the form of a hollow tube; carrying said second record engaging means at one end thereof; wherein said supporting means comprises a first compliant support and a second compliant support; the other end of said tubular support arm being secured to said first compliant support; said second compliant support securing the other end of said pickup arm to said tubular support arm such that said pickup arm is disposed substantially centrally of said tubular support arm.

6. Apparatus as defined in claim 1 where said second record engaging means comprises a preplay stylus also having an elongated rigid element tapering to a tip at one end thereof, which tip is dimensioned for reception within said groove during playback.

7. Apparatus as defined in claim 1 wherein said second record engaging means comprises a pad having a plurality of projecting bristles.

* * * * *